United States Patent
Rodriguez Perez et al.

(10) Patent No.: US 12,124,526 B2
(45) Date of Patent: Oct. 22, 2024

(54) DYNAMIC REROUTING OF UNIFORM RESOURCE IDENTIFIERS HAVING DIFFERENT SYNTAXES

(71) Applicant: Sys-Tech Solutions, Inc., Princeton, NJ (US)

(72) Inventors: Octavio Rodriguez Perez, Las Vegas, NV (US); David J. Henderson, Washington Crossing, PA (US); Taulant Dhami, Yardley, PA (US)

(73) Assignee: Sys-Tech Solutions, Inc., Princeton, NJ (US)

( * ) Notice: Subject to any disclaimer, the term of this patent is extended or adjusted under 35 U.S.C. 154(b) by 205 days.

(21) Appl. No.: 17/695,480

(22) Filed: Mar. 15, 2022

(65) Prior Publication Data

US 2022/0292157 A1 Sep. 15, 2022

Related U.S. Application Data

(60) Provisional application No. 63/161,352, filed on Mar. 15, 2021.

(51) Int. Cl.
*G06F 15/16* (2006.01)
*G06F 3/00* (2006.01)
(Continued)

(52) U.S. Cl.
CPC ...... *G06F 16/9554* (2019.01); *G06F 16/9537* (2019.01); *G06F 40/211* (2020.01)

(58) Field of Classification Search
None
See application file for complete search history.

(56) References Cited

U.S. PATENT DOCUMENTS

| 8,190,279 B2 | 5/2012 | Clark |
| 9,582,595 B2 | 2/2017 | Trifa et al. |

(Continued)

FOREIGN PATENT DOCUMENTS

AU  2016201542  9/2016

OTHER PUBLICATIONS

"Allow more regex for paths" https://github.com/remix-run/react-router/discussions/9844 (Year: 2021).*
(Continued)

*Primary Examiner* — Nicholas R Taylor
*Assistant Examiner* — Ho T Shiu
(74) *Attorney, Agent, or Firm* — Fish & Richardson P.C.

(57) ABSTRACT

Methods, systems, and apparatus, including medium-encoded computer program products, for dynamic rerouting of uniform resource identifiers having different syntaxes. A method includes a server receiving from a computing device a request that includes an initial uniform resource identifier (URI) that includes a product identifier. The request can be generated by the user scanning a product tag. Based on the identifier, the server finds two or more routing policy entries associated with the product. Each policy entry can include a regular expression that specifies syntax for parsing the initial URI and at least one variable. The server eliminates any routing policy having a context specification that does not match the request's context information and any routing policy entries having a regular expression that does not match the initial URI. The server composes a target URI based on a remaining routing policy entry and redirects the computing device to the target URI.

20 Claims, 11 Drawing Sheets

(51) Int. Cl.
*G06F 16/9537* (2019.01)
*G06F 16/955* (2019.01)
*G06F 40/211* (2020.01)

(56) References Cited

U.S. PATENT DOCUMENTS

| | | | |
|---|---|---|---|
| 9,794,321 B2 | 10/2017 | Trifa et al. | |
| 9,940,572 B2 | 4/2018 | Soborski | |
| 10,061,958 B2 | 8/2018 | Voigt | |
| 10,235,597 B2 | 3/2019 | Voigt et al. | |
| 2006/0242105 A1* | 10/2006 | Shur | G06F 16/9566 707/E17.115 |
| 2008/0215995 A1* | 9/2008 | Wolf | G06T 11/00 715/753 |
| 2011/0276691 A1* | 11/2011 | Jou | G06F 16/9566 709/245 |
| 2014/0018105 A1* | 1/2014 | O'Neil | H04L 67/02 455/456.3 |
| 2018/0314869 A1 | 11/2018 | Soborski | |
| 2019/0005288 A1 | 1/2019 | Soborski | |
| 2019/0190739 A1 | 6/2019 | Guinard et al. | |
| 2020/0151738 A1 | 5/2020 | Guinard et al. | |
| 2020/0226617 A1* | 7/2020 | Meadow | G06K 19/06037 |

OTHER PUBLICATIONS

"Express router with regex expression to match multiple paths" https://stackoverflow.com/questions/69776673/express-router-with-regex-expression-to-match-multiple-paths (Year: 2021).*

"Creating a regular expression for a URI path" https://stackoverflow.com/questions/40899302/creating-a-regular-expression-for-a-uri-path (Year: 2016).*

"Regex to match URL Path pattern" https://stackoverflow.com/questions/73310279/regex-to-match-url-path-pattern (Year: 2022).*

Extended European Search Report in European Appln No. 22162352.3, dated Jul. 20, 2022, 9 pages.

* cited by examiner

DYNAMIC REROUTING OF UNIFORM RESOURCE IDENTIFIERS HAVING DIFFERENT SYNTAXES

CROSS-REFERENCE TO RELATED APPLICATION

This application claims the benefit of U.S. Provisional Pat. App. No. 63/161,352, filed Mar. 15, 2021, which is incorporated by reference.

BACKGROUND

This specification relates to routing requests for content to an appropriate server. A user can provide to a computing system a uniform resource identifier (URI) that identifies a content element. In some cases, the computing system can provide the content element, but in other cases, the computing system can redirect the request to a different computing system.

SUMMARY

This specification describes technologies relating to dynamic rerouting of URIs having different syntaxes. Routing directives can be configured for various types of URIs that include identifiers of products, and a rerouting engine can examine incoming URIs, apply corresponding directives, and re-route each request appropriately.

Particular embodiments of the subject matter described in this specification can be implemented so as to realize one or more of the following advantages. The techniques described below can be used to store content relevant to a product and to deliver that content in response to a request, or to reroute the request to a second location that stores the relevant content. The techniques further enable the construction of a target uniform resource locator (URL) or URI that can include information contained in a source URL or URI, and can be constructed using user-defined static and dynamic variables. When rerouting a request, the techniques can also support a wide-range of routing directives and can select the best matching route entry based on factors that can include the date, geolocation, language, and so on. The techniques further enable the display and review of the rerouting directives before, during and/or after they are deployed. In addition, the techniques described below can be used to reroute requests for content elements sent to a computing system to a second computing system that is better suited to provide the content element. The rerouting can improve the technical functions of the computing system by balancing load among servers. The rerouting can further improve the technical functions of the computing system by directing the request to a computing system nearer the requester, reducing networking load and improving response time. The techniques described below can also be used to parse requests that include URIs or URLs that are not encoded according to a standard format. Such improved parsing increases the number of requests that can be satisfied by the computing system, thereby reducing the load on the computing system, e.g., by reducing number of follow-up requests received from users in response to their requests that were rejected because of a non-standard format.

In general, one or more aspects of the subject matter described in this specification can be embodied in one or more methods (and also one or more non-transitory computer-readable mediums tangibly encoding a computer program operable to cause data processing apparatus to perform operations) including: receiving, by a server system, a request from a computing device of a user, where the request includes an initial uniform resource identifier (URI) including an identifier of a product of an enterprise, and the request has been generated from the user scanning a tag that is physically or digitally associated with a specific instance of the product or any object. The tag can be a bar code, a data matrix, a Quick Response (QR) code, alphanumeric code, an RFID (Radio Frequency Identifier) tag, an NFC (Near Field Communication) tag, etc. An NFC tag can be used to exchange data or create digital association between objects and devices, typically by a gesture of placing an NFC tag near a phone or vice versa. Moreover, a "tag" (as used in this document) also refers to (or constitutes) a "label".

The one or more methods include finding, by the server system and based on the identifier of the product, a set of two or more routing policy entries that have been associated with the product by the enterprise. Note that there can be one or more routing policies, each with one or more routing policy entries defined therein. Also, each routing policy entry in the set includes a regular expression (e.g., RegEx) that specifies syntax for parsing the initial URI, and at least one of the routing policy entries in the set includes at least one variable defined by the enterprise.

The one or more methods include: eliminating, by the server system, any routing policy entries from the set having an associated context specification (e.g., date, language, and geolocation criteria) that does not match context information associated with the request; and eliminating, by the server system, any routing policy entries from the set having a regular expression (e.g., RegEx expression mapping the source URI) that does not match the initial URI. Further, the one or more methods include: composing, by the server system, a target URI based on a remaining routing policy entry (the at least one of the routing policy entries in the set with the at least one variable) including evaluating the at least one variable at the time of the composing to inform the composing of the target URI; and redirecting, by the server system, the computing device to the target URI, thereby causing both production of content in accordance with the target URI and delivery of the content to the computing device of the user.

Other embodiments of this aspect include corresponding systems, apparatus, and computer program products. For example, a system can include: a user device; and one or more computers operable to interact with the user device and to perform the one or more methods described in this application. The one or more computers can include a server system (one or more server computers) operable to interact with the user device through a data communication network, and the user device can be operable to interact with the server system as a client. The user device can include any suitable computing device such as a personal computer, a tablet computer, a mobile device, or a smart phone adapted for web browsing.

These and other embodiments can optionally include one or more of the following features. The regular expression of at least the remaining routing policy entry can be defined by the enterprise to specify the syntax for parsing the initial URI into pieces, the at least one variable can include a variable specifying one or more of the pieces of the initial URI, the evaluating can include extracting the one or more pieces of the initial URI, and the composing can include adding the one or more pieces of the initial URI to the target URI. Note that in addition to URI parsing system being defined by the enterprise for at least some incoming URIs, one or more of the policy entries can have a regular expression that is defined by the server's company in accordance with a standard, such as GS1 Digital Link or other suitable standard, and/or with a URI syntax standard, which enables pointing to a static or dynamic digital location or source, including for example a website. Note that uniform resource locators (URL) can be used instead of URIs.

The one or more methods can also include: presenting, by the server system, a user interface that enables definition of the routing policy entries by the enterprise, including definition of context specifications, regular expressions and variables; specifying, by the server system, the routing policy entries in accordance with first input received from the enterprise via the user interface; and associating, by the server system, the identifier of the product with the routing policy entries in accordance with second input received from the enterprise via the user interface. Further, specifying the routing policy entries can include specifying how to compose a target URI for each respective routing policy entry using one or more of the variables defined by the enterprise and presented in a browsing element of the user interface, where each of the variables references static content, dynamic content, another variable, or a combination thereof.

The evaluating can include retrieving, by the server system and from a computer system configured to track products as the products travel through a supply chain (e.g., calling the API of a system that persists packaging and aggregation details), metadata for the specific instance of the product; and the composing can include adding at least a portion of the metadata to the target URI. In general, one or more attributes that are not in the URI (or URL) can be retrieved, validated, and used to compose the target URI (or URL).

The identifier of the product can include a product identifier plus a serial number of the specific instance of the product, the retrieving can include sending the serial number to the computer system and receiving the metadata, and the metadata can include one or more of lot information, expiration date, current state of the product, born on information, and recall information. Note that these are just some examples of attributes can be used. In general, any suitable attribute associated with the product can be used, e.g., as generated by interrogating a product tracking and/or authentication server system to validate that the product exists and its attributes are what is expected, such as matching a specific lot number for the product or confirming the product was last seen at a specific location in the supply chain.

In addition, the user interface can enable inbound request simulation as the routing policy entries are being defined by the enterprise. Thus, the one or more aspects of the subject matter described in this specification can be embodied in one or more methods (and also one or more non-transitory computer-readable mediums tangibly encoding a computer program operable to cause data processing apparatus to perform operations, and corresponding systems and apparatus) including: presenting, by a server system, a user interface that enables definition of routing policy entries by an enterprise, including definition of context specifications, regular expressions and variables; specifying, by the server system, the routing policy entries in accordance with first input received from the enterprise via the user interface; associating, by the server system, an identifier of a product with the routing policy entries in accordance with second input received from the enterprise via the user interface; and simulating, by the server system, an inbound request in accordance with third input received from the enterprise via the user interface, where the third input includes context information (e.g., language and location data entered via the user interface) and an initial uniform resource identifier (URI) including the identifier of the product of the enterprise.

The simulating can include: finding, based on the identifier of the product, a set of two or more of the routing policy entries, where each routing policy entry in the set includes a regular expression that specifies syntax for parsing the initial URI, and at least one of the routing policy entries in the set includes at least one variable defined by the enterprise; eliminating any routing policy entries from the set having an associated context specification that does not match the context information; eliminating any routing policy entries from the set having a regular expression that does not match the initial URI; composing a target URI based on a remaining routing policy entry, which is the at least one of the routing policy entries, including evaluating the at least one variable at the time of the composing to inform the composing of the target URI; and displaying the target URI in the user interface for confirmation by the enterprise. Also, in some implementations, a bar code, a data matrix, or a QR code is also generated and displayed for use in a scanning test.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIG. 6 shows an example of a landing page editor.

FIG. 9 shows an example of a barcode designer tab.

FIG. 11 shows an example of an active routing verification editor.

DETAILED DESCRIPTION

Figure 1:
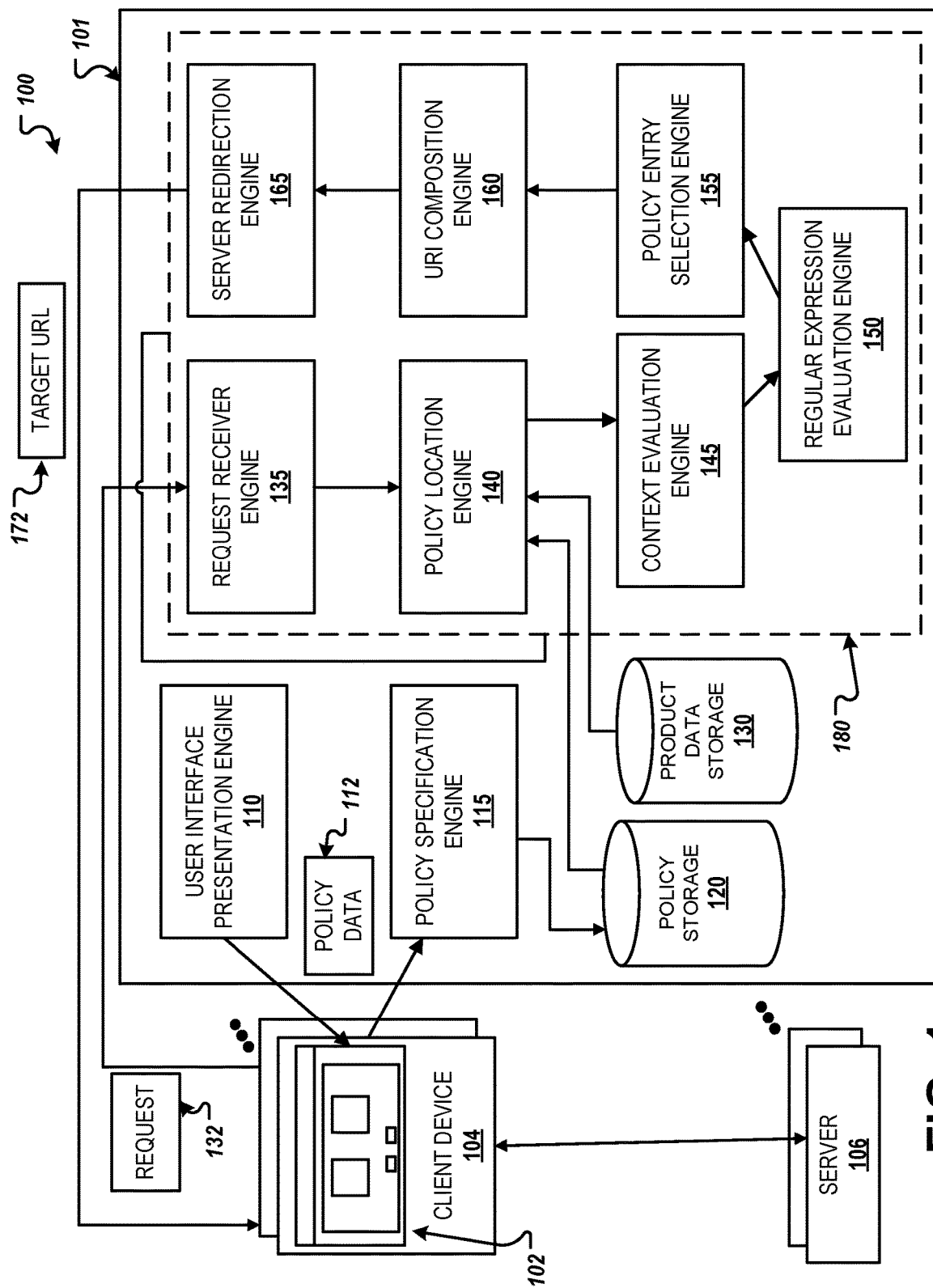
FIG. 1 shows an example of an environment for dynamic rerouting of URIs having different syntaxes.

A computing system can provide information to users by accepting a URI (or other identifier of content), retrieving information associated with the URI, and returning the information to the user. A user can initiate creation of a URI using various techniques. For example, a user device can interact with a product connection point, for example by scanning a QR code that encodes a URI using a mobile device's camera. As another example, a user can tap a mobile device to an NFC tag. The mobile device can then use installed software to extract the URI from the QR code and transmit the URI to a server. Scanning or tapping a product connection point instead of typing one provides convenience to the user as the scanning typically requires less effort and is less error prone than typing. In addition, the packaging on many products already includes various codes, so allowing a user to scan a code provides a convenient way for users to retrieve relevant information.

The mobile device (or other suitable computing device) can then send the code to a computing system that contains information relevant to the code. However, such an approach decreases the system flexibility since once a QR code has been printed, and includes a particular URI, a server must be available to provide content associated with the URI.

The techniques described in this specification are designed to be compatible with and operable by any computing device, including, for example, a personal computer (desktop or laptop), a mobile device, a smart phone, a smart tablet, an Internet of Things device, an augmented realty (AR) or virtual reality (AR) device, a personal digital assistant (PDA), a gaming console or device, a playback appliance, a wearable device, a mobile station, or a combination thereof. The techniques are further designed to be compatible with and operable by any computing device adapted for web browsing.

Rather than storing the information on such a fixed computing system, and having a code point to that information on that fixed computing system, codes can instead be used as indirection mechanisms used to retrieve the location of the relevant information. A computing system can receive a code from a user device, determine the location of the relevant information, and redirect the user device to that location. For example, the system can maintain a table to map incoming URIs to target URIs, and when the system receives an incoming URI, the system can reroute the client to the target URI. Therefore, the computing system can flexibly manage the location of data by changing the mapping of codes to locations.

While such systems provide some technical improvement, the static nature of such systems is an important limitation since the retrieved URI depends only on the incoming URI and does not depend on dynamic information. For example, if a request originates in California, it can be beneficial to redirect the user device to a data center in or near California instead of a data center that is farther away, e.g., in New York. In addition, if a data center is heavily loaded, redirecting a user device to a lesser-loaded data center can provide technical benefit by balancing load across data centers. However, such context-dependent redirection requires that the system providing the redirection information has the ability to evaluate dynamic parameters. This specification describes techniques for performing redirection according to such dynamic parameters.

In addition, when an incoming URI does not follow a standard format, the redirecting system might be unable to parse all or part of the incoming URI and therefore may be unable to provide proper redirection instructions. Rather than discarding such URIs, using the techniques described in this specification, a redirection system can apply parsing rules to the incoming URI, enabling the redirection system to parse the URI and create a target URI that includes valid redirection instructions.

FIG. 1 shows an example of an environment for dynamic rerouting of URIs having different syntaxes. The environment 100 includes a system 101 for dynamic rerouting of URIs having different syntaxes, one or more client devices 104 and one or more servers 106. The system 101, client devices 104 and servers 106 can communicate over a data communication network, such as a local area network (LAN), a wide area network (WAN), the Internet, a mobile network, or a combination thereof.

A client device 104 is an electronic device that is capable of communicating over the network. Example client devices 104 include desktop computers, laptop computers, and mobile communication devices, e.g., smartphones and tablets. A client device 104 includes an operating system (OS) that is capable of running applications, displaying user interfaces and accepting user input, among other functions. One example application is a web browser that is capable of rendering content in formats such as Hypertext Markup Language (HTML) and Extensive Markup Language (XML). A web browser can also display forms and execute active content, such as programs written in Java and JavaScript.

The system 101 can include a user interface presentation engine 110, a policy specification engine 115, policy storage 120, product data storage 130 and an Active Routing Policy Engine (ARPE) 180. The ARPE can include a request receiver engine 135, a policy location engine 140, a context evaluation engine 145, a regular expression evaluation engine 150, a policy entry selection engine 155, a URI composition engine 160, and a server redirection engine 165.

The user interface presentation engine 110 can provide user interface presentation data that, when rendered by a client device 104, produces a user interface 102 on the client device 104. The user interface presentation data can represent a native application designed for the client device (e.g., written in the C programming language and compiled for the device), a portable application (e.g., written in Java and compiled into Java bytecodes), a web application executable by a web browser or other conventional user interface specifications. The user interface presentation engine 110 can provide the user interface presentation data to the client device 104 over the network using any suitable protocol. For example, the client device can request the user interface 104 (e.g., using Hypertext Transfer Protocol (HTTP)), and user interface presentation engine 110 can respond over HTTP with the user interface presentation data. An example user interface 104 is described further in reference to FIGS. 4-9.

A user can interact with the presentation data included in the user interface 104 to provide policy data 112 used to create active routing policies ("policies," for brevity) to the policy specification engine 115. The system 101 can then use the policies to determine how to parse a request 132 and to use the parsed data when constructing a target URI, as described further below.

Policy data 112 can include a context specification and routing directives. The context specification can be expressed as criteria that can contain Boolean expressions of arbitrary complexity and/or any expression that produces a Boolean output. Elements of the expression can depend on elements that can be present in the request 132, the context of the request 132, the state of the system 101, elements present in the product connection point, elements present in the user device, and the state of other computing systems. For example, criteria can include the times of day that the policy is active, language of the request, measures of load of one or more computing elements (servers, storage, network, etc.), system 101 location, and so on.

The system 101 uses routing directives to create target URIs 172. Routing directives can include expressions, e.g., regular expressions, that specify syntax for parsing initial URIs, which can be URLs, into pieces. Note that a URL is an instance of a URI. Each expression can include attributes such as static text and variables. For example, static text can indicate a product identifier prefix, and a variable can indicate dynamic factors such as date, time, geolocation of the user or other nearby product connection points, or language.

The attributes included in the routing directive and used to construct the target URI 172 can include: (i) any accessible element from the source URI included in the request, (ii) any user-defined variable, (iii) static text, (iv) any software metadata (e.g., as maintained by a product tracking system, which is a computer system that traces products through a supply chain), (v) any information about the environment (e.g., time of day) and (vi) any other source of information available to the system 101. For example, the system can determine the unique serial number of a product from the URL, use the serial number to retrieve additional metadata from a database such as a product tracking system, and include all of part of the metadata in the target URI 172.

In some implementations, a routing directive is a template that defines the structure of the target URI, and can include static and variable content, as described above. For example, a routing directive can indicate that the target URI is to be constructed using an example template such as: https://ExampleServers{LeastLoaded}.com/products?ProductID={sourceURI.productID}, where "https://ExampleServers." is a non-variable component, {LeastLoaded} is a variable to be evaluated by the server (e.g., to determine an index of the least loaded server in a server farm), ".com/products>ProductID=" is a second non-variable component, and "{sourceURI.productID}" is a variable to be evaluated by the server (e.g., to determine the 'productID" element of the source URI).

The policy specification engine 115 can accept policy data 112 from the client device 104 and create a policy. A policy can be expressed in any suitable form, such as Extensible Markup Language (XML). For example, a policy can be expressed as illustrated in Listing 1, below.

---
LISTING 1
---

```
<POLICY>
   <CRITERIA>
      <CRITERION> ... <CRITERION>
      <CRITERION> ... <CRITERION>
   </CRITERIA>
   <ROUTING_DIRECTIVE>
      ...
   </ROUTING_DIRECTIVE>
</POLICY>
```

The example policy of Listing 1 has a criteria element containing two criterion elements and one routing directive element. In some implementations, a policy can include any number of criterion elements (a policy with no criterion can be treated as a policy with one criterion that always evaluates to TRUE), and one or more routing directives.

In another example, criteria and routing directives can be stored separately from a policy, and a policy can reference criteria and routing directives using identifiers. An example format is illustrated in Listing 2, below.

---
LISTING 2
---

```
<CRITERIA_LIST>
   <CRITERION ID="1"> ... </CRITERION>
   <CRITERION ID="2"> ... </CRITERION>
   ...
</CRITERIA_LIST>
<ROUTING_DIRECTIVES>
   <ROUTING_DIRECTIVE ID="100"> ... </ROUTING_DIRECTIVE>
   <ROUTING_DIRECTIVE ID="101"> ... </ROUTING_DIRECTIVE>
   ...
</ROUTING_DIRECTIVES>
```

---
LISTING 2
-continued
---

```
<POLICY>
   <CRITERIA> "1" </CRITERIA>
   <CRITERIA> "2" </CRITERIA>
   <ROUTING_DIRECTIVE>"1"</ROUTING_DIRECTIVE>
</POLICY>
```

In some implementations, a policy can include criteria elements, references to criteria elements, routing directive elements and references to routing directive elements, in any combination. Further, criteria elements and routing directive elements that are specified by reference in a policy need not be stored together on a single system. For example, a reference can be expressed as a URI that can include the location of a server that includes the referenced element (routing directive or criteria). When evaluating the elements of the policy, the system can retrieve the referenced elements, e.g., using HTTP.

In some implementations, a routing policy entry can be derived by utilizing a decision tree that utilizes criteria elements to construct a URI/URL and determines which display elements or web components within the destination webpage to show or hide to the user based on the presence or absence of particular criteria. For example, if the user interacts with a connection point for a counterfeit product, the decision tree will be utilized to determine whether the encrypted key from the product connection point is associated with an authentic product. The decision tree will be utilized to direct the user to authorized content for an authenticated product or to direct the user to contact the product hotline for further assistance.

In all cases, and in other possible policy formats, each policy can access a set of criteria that is used to locate the best matching routing entry by the Active Routing processing engine, and the routing entry can specify the target URL composition instructions.

Note that the criteria across multiple policies need not be mutually exclusive, and in some circumstances, the criteria from multiple policies will be satisfied. In addition, as noted above, one policy can contain multiple routing directives. Therefore, there can be multiple routing directives that can apply to a request. The set of routing directives across all policies and associated criteria are called "routing policy entries," and the system can select a routing directive based on the criteria and other factors, as described further below. Having created a policy, the policy specification engine 115 can store the policy in the policy storage 120.

The policy storage 120 can be any appropriate data storage system, such as one or more relational databases, a file system stored on a disk drive or a network attached storage (NAS) device, block storage devices, and so on. Further, while the policy storage 120 is illustrated as being part of the system 101, policy storage 120 can exist at any location that is accessible by the system 101, e.g., over a network.

The request receiver engine 135 can accept requests 132 from one or more client devices 104. Note that while FIG. 1 shows the same client device 104 providing the policy data 112 and the request 132, more commonly, policy data 112 will come from one client device 104 and the request 132 will come from a separate client device 104. However, in some cases, the policy data and the request will both come from client devices associated with the same enterprise.

A request 132 can include a URI, which can have the following components: scheme (e.g., http, https, ftp), user information, host, port, path, query information and fragment. (The combination of user information, host and port can be called the "authority.") For example, a URI with all such components can be: "https://johndoe@example.com:111/files?ID=12#top", where "https" is the scheme, "johndoe" is the user information, "example.com" is the host, "111" is the port, "files" is the path, "ID=12" is the query information and "top" is the fragment. The request can further include other metadata providing context for the request, which can include the date, geolocation, user language, etc. Such metadata can be included in the URI of the request 132 or included as additional data in the request 132.

Geolocation generally refers to the real-world geographic location of a user, an object or a device, by applying one or more geolocating techniques. Geolocating techniques derive the spatial location (e.g., X, Y, Z Cartesian coordinates) of an object by processing transmitted signals that are received, emitted, or reflected by that object. Geolocation techniques may utilize one or more geolocating technologies including, for example, Global Positioning Satellite (GPS), Bluetooth Low Energy (BLE), Wireless Fidelity (WIFI) and network triangulation. The terms "location" and "geolocation" are used interchangeably herein, unless context indicates otherwise.

One element of a request 132 can be a code that is associated with a product. A code can be any type of printed or electronic code that is capable of encoding information. Examples can include one-dimensional bar codes, two-dimensional bar codes (e.g., Quick Reaction (QR) codes), radio frequency identifiers (RFIDs), NFC (Near Field Communication) tags and so on. The code can include product related information, such as a product identifier, and additional parameters that may be used for dynamically creating URIs. The code can be encoded with an encryption key and successful decryption determines the destination web page constructed. The code can include a product connection point identifier, for example whether the technology is a QR code or an NFC tag. The code can include an encrypted code that generates at each interaction with the product connection point. In some implementations, event data such as every interaction (or a subset of the interactions) and related information, such as attributes, parameters or elements related to the connection point, the user device, or the digital destination are tracked, recorded and stored by the enterprise.

The request receiver engine 135 can accept requests 132 over any suitable networking protocol. For example, the request receiver engine 135 can accept request over HTTP or HTTPS, and the request receiver engine 135 can provide a Web Service Application Programming Interface (API). The request receiver engine 135 can transmit the request 132 to the policy location engine 140.

The policy location engine 140 can determine the URI included in the request 132, determine the product relevant to the URI, and determine the set of policies relevant to the product using information included in the request 132, information relevant to the product, and other available information, e.g., location of the device 104, language of the web browser of the device 104, time of day, day of week, load on the servers 106, etc.

The policy location engine 140 can determine information relevant to the product by consulting one or more product data storage elements 130. Product data storage 130 can store associations between product identifiers that are included in codes and product information. Product information can include various metadata about the product, e.g., product description, locations the product is sold, price, etc. In response to receiving a code, the system can identify the product identifier, provide the product identifier to product data storage 130, and receive the corresponding product information.

Product data storage 130 can be any appropriate data storage system, such as one or more relational databases, a file system stored on a disk drive or a network attached storage (NAS) device, block storage devices, and so on. Further, while the product data storage 130 is shown as being part of the system 101, product data storage 130 can exist at any location that is accessible by the system 101, e.g., over a network.

The policy location engine 140 can transmit the relevant policy entries to the context evaluation engine 145. The context evaluation engine 145 can eliminate from the list of relevant policies, any routing policy entries from the set having an associated context specification that does not match context information associated with the request. The context evaluation engine 145 can transmit the remaining routing policy entries—that is, those not eliminated—to the regular expression evaluation engine 150.

The regular expression evaluation engine 150 can eliminate any routing policy entries from the set having a regular expression that does not match the initial URI. The regular expression evaluation engine 145 can transmit the remaining routing policy entries to the policy entry selection engine 155, which can select a remaining routing policy entry and transmit that entry to the URI composition engine 160.

The URI composition engine 160 can generate a target URI according to the selected routing policy entry. The target URI can specify the server 106 to which the client device 104 will be redirected, and include information from the request and additional information, as described further below.

The server 106 can include one or more computing system configured to receive target URIs and to provide content associate with the target URIs. In some implementations, the server 106 is a computing system that runs a web server (e.g., the Apache HTTP Server), an application server (e.g., Apache Geronimo), both a web server and an application server, or other software configured to provide content associated with a URI.

The server 106 can include product data storage 130 or it can access product data storage 130 over a network. The server can determine a product identifier from the target URI, use the product identifier to retrieve content from the product data storage 130, and provide the retrieve content to the client device 104.

The server redirection engine 165 redirects the client device 104 to the target URI. The server redirection engine 165 can transmit a redirect message to the client device 104 that indicates the target URI. For example, the server direction engine 165 can provide an HTML, document that includes an http-equiv attribute, such as:

<head><meta http-equiv="Refresh" content="0; URL='https://example.com/'"></head> where 'https://example.com/' is the target URI.

In another example, the server redirection engine 165 can provide to the client device 104 a redirect message that is an HTTP 302 response code that contains a location header that includes the target URI. Other 300-family HTTP redirect codes (e.g., HTTP response codes 301 or 307) can be used in addition to, or instead of, HTTP response code 302.

Figure 10:
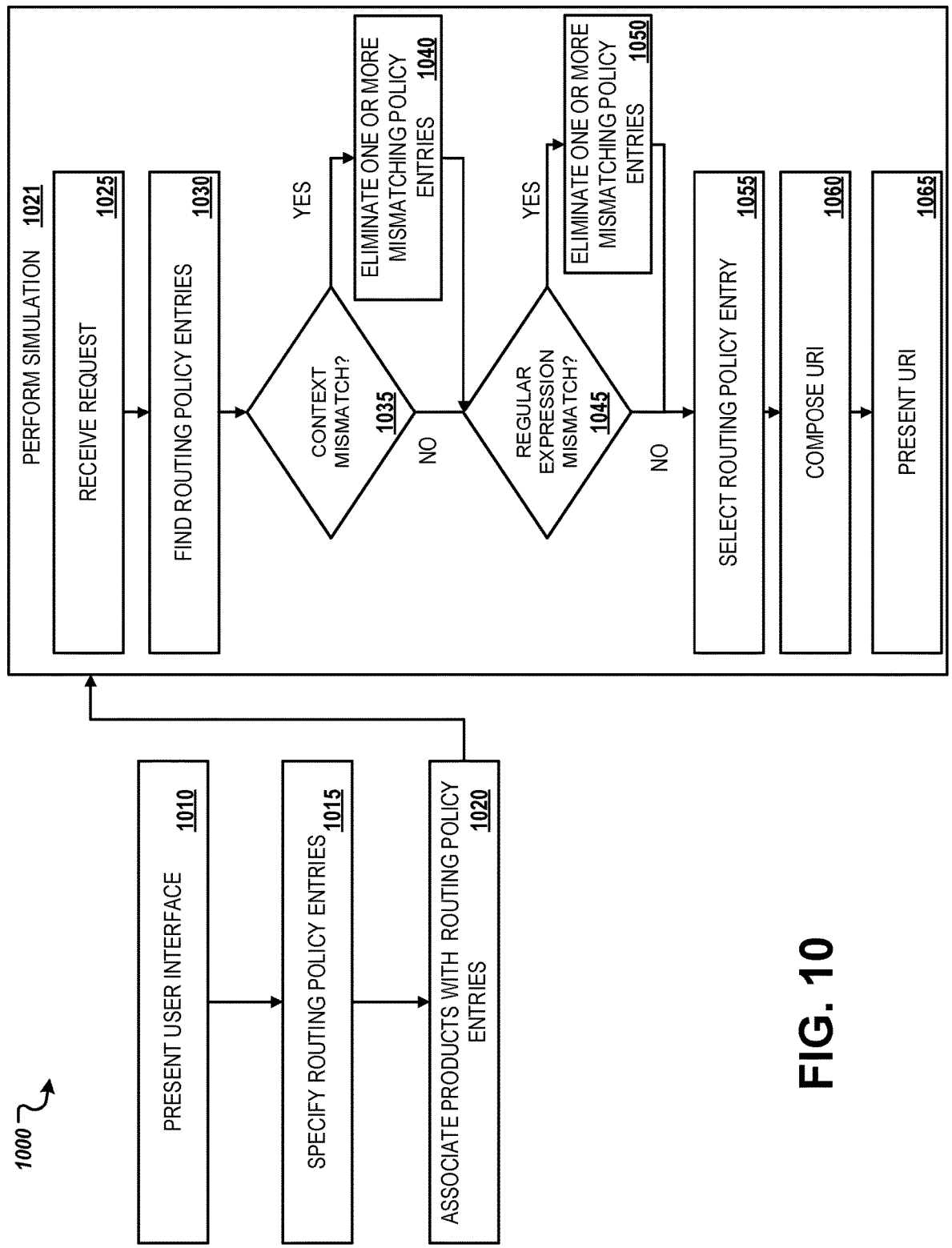
FIG. 10 shows a process for simulating dynamic rerouting of URIs having different syntaxes.

The system 101 can further provide user interface presentation data that enables a user to preview and/or verify the active route resolution through simulation of inbound requests, as described further in reference to FIG. 10.

Figure 2:
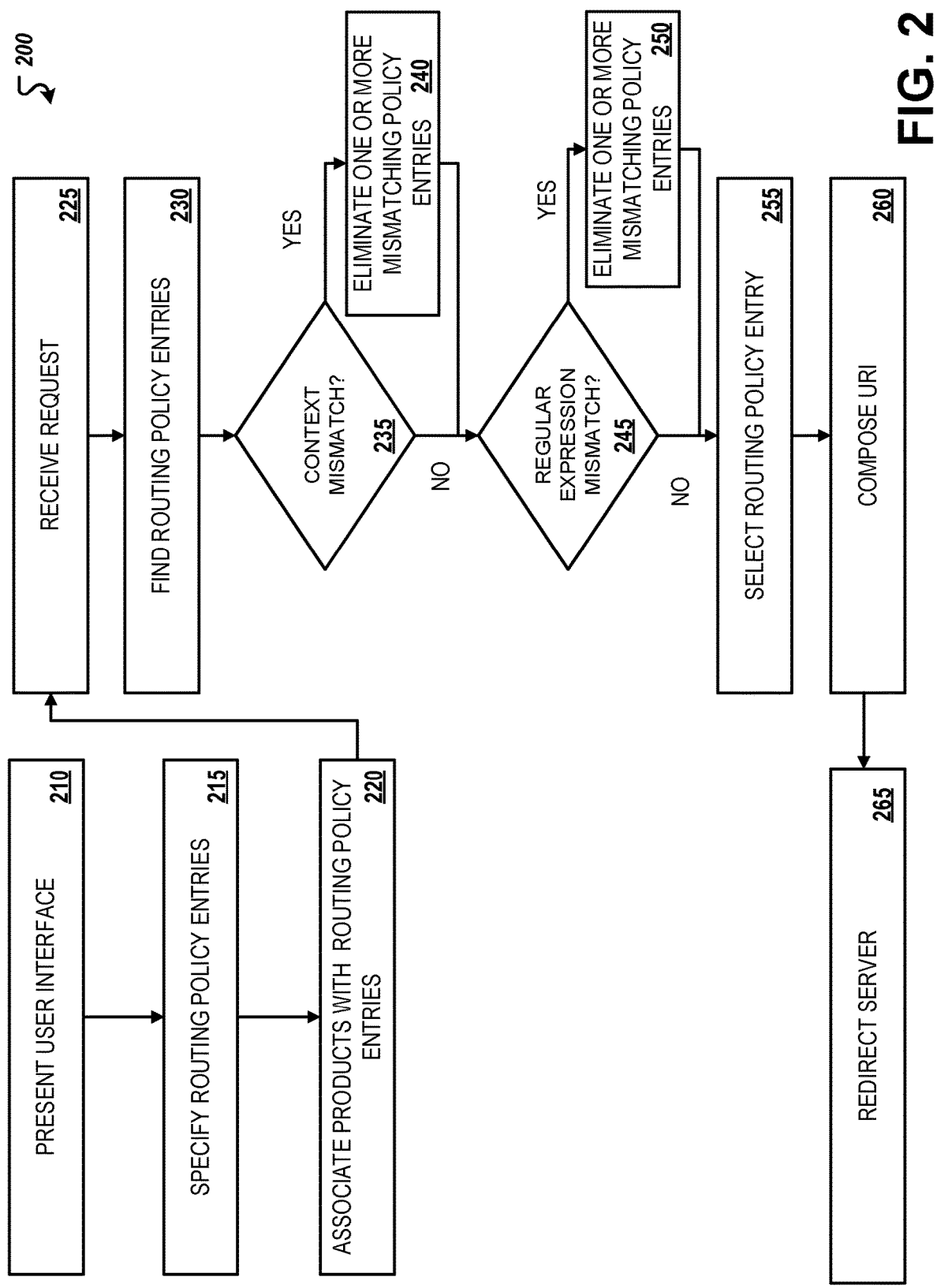
FIG. 2 shows a process for dynamic rerouting of URIs having different syntaxes.

FIG. 2 shows a process for dynamic rerouting of Uniform Resource Identifiers having different syntaxes. For convenience, the process 200 will be described as being performed by a system for dynamic rerouting of Uniform Resource Identifiers having different syntaxes, e.g., the system 100 for dynamic rerouting of Uniform Resource Identifiers having different syntaxes of FIG. 1, appropriately programmed to perform the process. Operations of the process 200 can also be implemented as instructions stored on one or more non-transitory computer readable media, and execution of the instructions by one or more data processing apparatus can cause the one or more data processing apparatus to perform the operations of the process 200. One or more other components described herein can perform the operations of the process 200.

The system presents (210) a user interface by providing user interface presentation data to a client device. The user interface presentation data include instructions that, when executed by a client device, creates one or more user interface panels that enable a user to define routing policy entries, including definition of context specifications, regular expressions and variables, as described further below.

Figure 4:
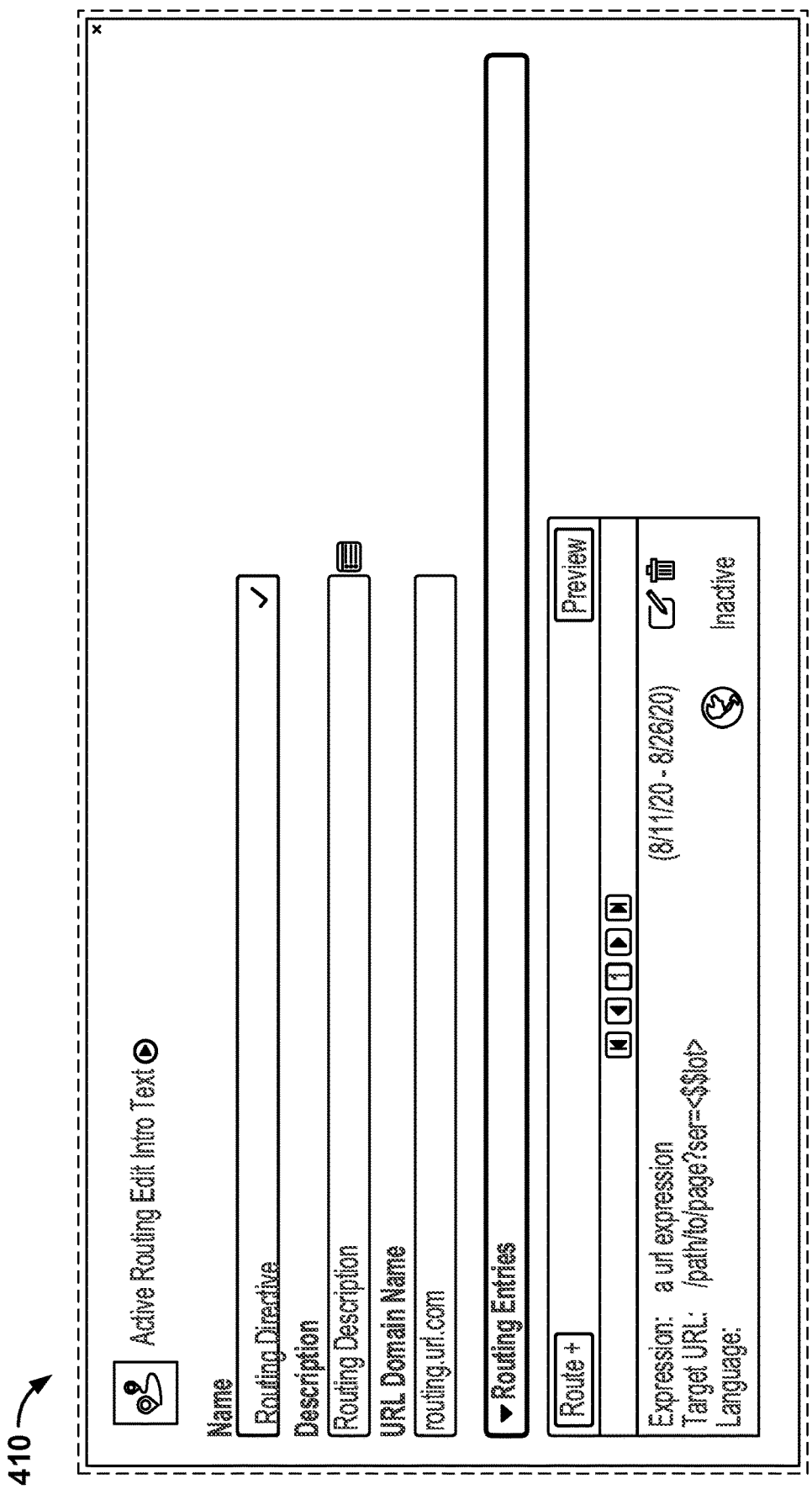
FIG. 4 shows an example of an active routing editor.

As shown in FIG. 4, in some implementations, the user interface presentation data can include instructions that direct a client device to render a user interface panel 410 that enables a user to provide information relating to a policy. For example, the user interface panel 410 can enable a user to name a routing directive, add a description of a routing directive, define a URL domain name and launch a user interface panel that enables a user to define routing policy entries.

Figure 5:
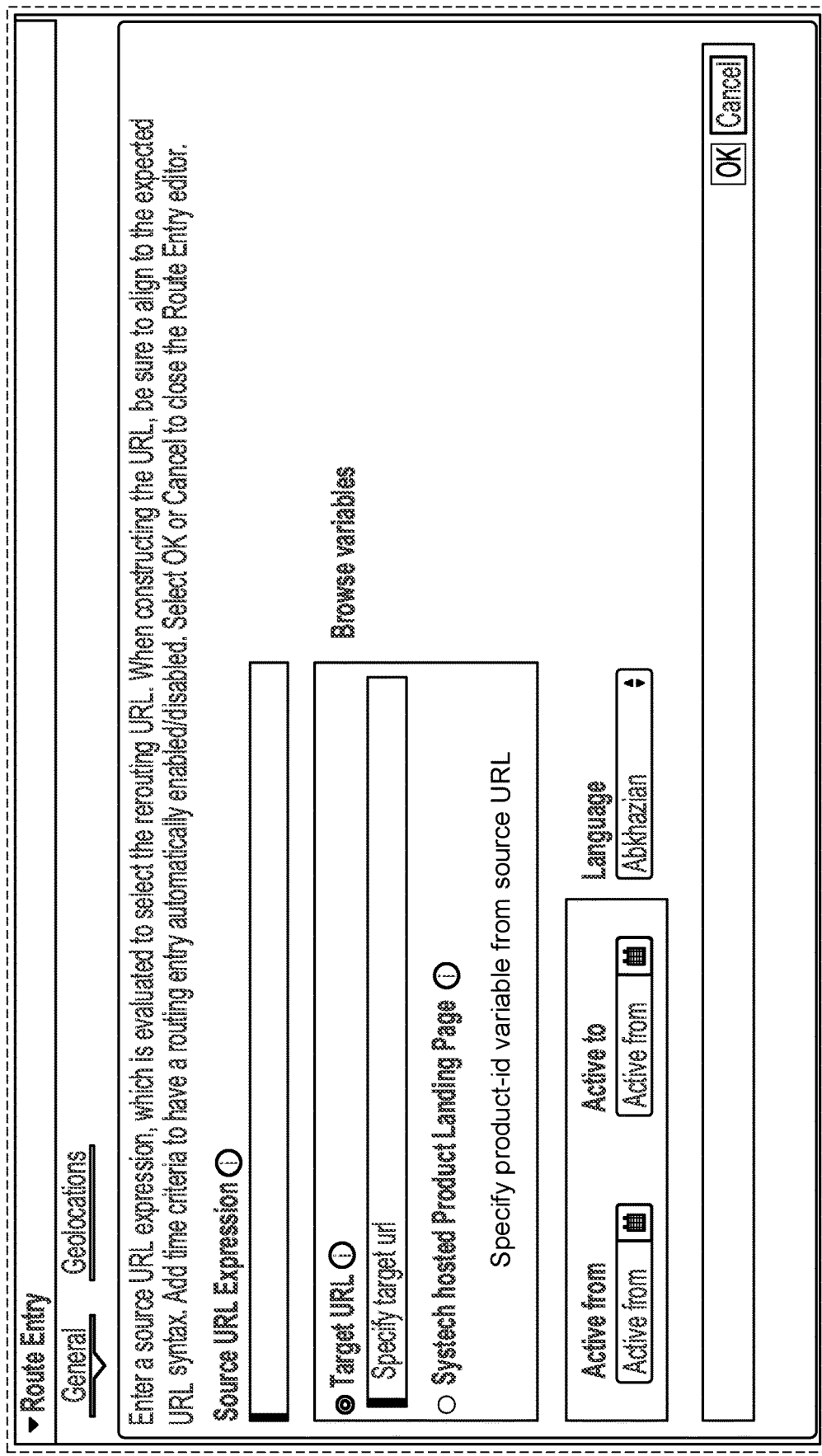
FIG. 5 shows an example of an active routing entry editor.

As shown in FIG. 5, in some implementations, the user interface presentation data can include instructions that direct a client device to render a user interface panel 510 that enables a user to provide information relating to a routing policy entry. For example, the user interface panel 510 can enable a user to provide a source URL expression, a target URL, the active period for the routing policy entry, the language, and other data relating to a routing policy entry.

Figure 6:
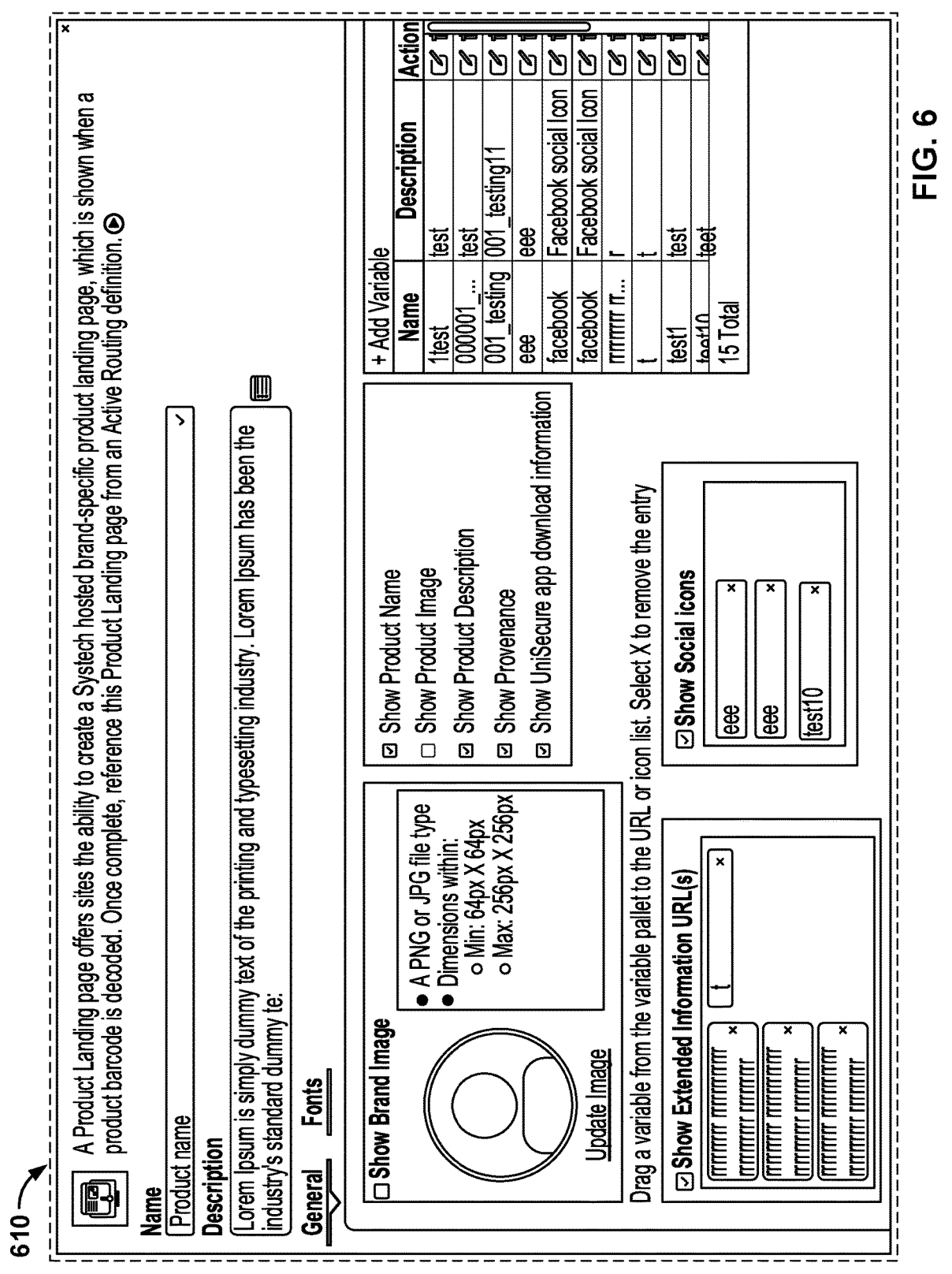

As shown in FIG. 6, in some implementations, the user interface presentation data can include instructions that direct a client device to render a user interface panel 610 that enables a user to provide information relating to a product landing page. The user interface panel 610 can include fields that enables a user to provide a product name, product description, a product logo or other image, and so. In some implementations, the user can represent the enterprise that provides the product. The enterprise may include a product manufacturer, a product brand owner, or a third party entity tasked with managing various aspects of the product.

Figure 7:
FIG. 7 shows an example of a product definition editor for active route association.

As shown in FIG. 7, in some implementations, the user interface presentation data can include instructions that direct a client device to render a user interface panel 710 that enables a user to associate routing policy entries with a product. The user interface panel 710 can include a user interface element 720 that enables a user to add associated routing policy entries to a product. The user interface panel 710 can also enable a user to specify a product landing page.

Figure 8:
FIG. 8 shows an example of an active routing tab usable to link product to routing instructions.

As shown in FIG. 8, in some implementations, the user interface presentation data can include instructions that direct a client device to render a user interface panel 810 that enables a user to associate a code, such as a QR code, with a product. The user interface panel 810 can include elements that present the product name and description and can include an element 820 that enables a user to specify codes associated with the product.

Figure 9:
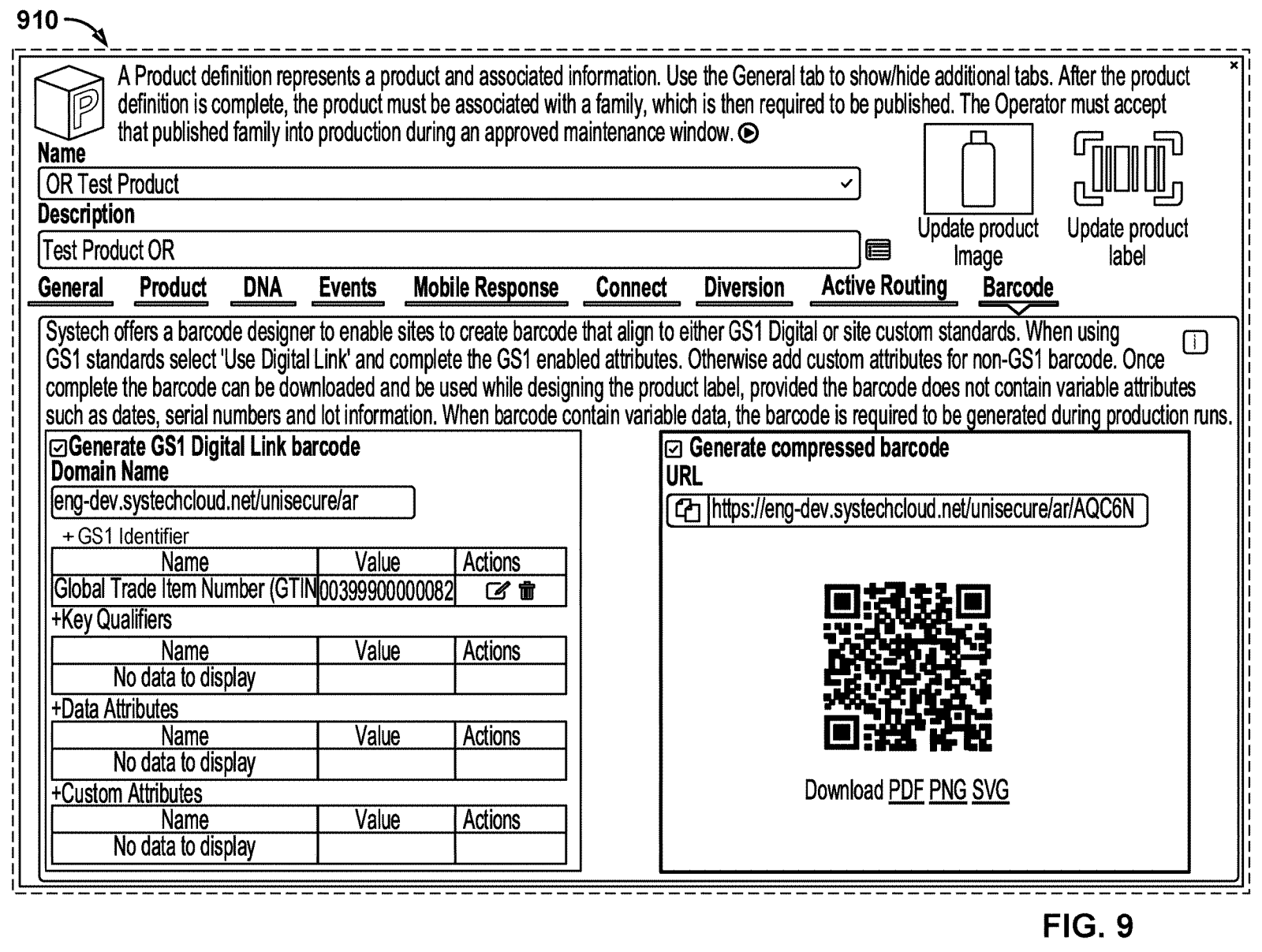

As shown in FIG. 9, in some implementations, the user interface presentation data can include instructions that direct a client device to render a user interface panel 910 that enables a user to map specific products to specific routing directives. Further, a barcode designer panel can be supported, enabling sites to specify a set of qualifiers and generate the barcode within the Product definition editor. Note that the systems and techniques described can support the rerouting of non-standard barcodes in addition to barcodes that conform to one or more industry standards. Further, the user interface can allow the user to generate barcodes that are compliant with one or more industry standards for barcodes or QR codes.

Upon receiving policy data, which can be provided in response to a user interacting with the user interface presentation data, the system specifies (215) routing policy entries in accordance with the policy data. As described in reference to FIG. 1, the policy data can include criteria and one or more routing directives. The system can identify the routing directives in the policy data by parsing XML, containing the policy data, and adding routing policy entries corresponding to the routing directives to a collection of routing policy entries.

The system associates (220) routing policy entries by associating the identifier of a product with the relevant routing policy entries in accordance with data received in response to a user interacting with user interface presentation data. In some implementations, the data can be created when a user interacts with user interface presentation data used to create a user interface panel that enables a user to associate product identifiers with routing policies, for example, as described in reference to FIG. 7. The association can be represented as a tuple that include a reference to the product and a reference to a policy that contains the routing policy entry. The system can receive such data describing the association and store the association in a storage system. For example, the associations can be stored in a table that includes one column for product identifiers, one column for routing policy entries, and one row per association.

The system receives (225) a request that includes an initial URI that includes a product identifier. The request can be generated from the user scanning a tag that is physically associated with a specific instance of a product. For example, the user can activate a QR code scanning application on a mobile device to capture the QR code associated with the product, and the QR code can encode the initial URI. In another example, the user can read a NFC tag associated with a product using a mobile device configured to read NFC tags that encodes the URI. In a further example, the user can read a one-dimensional bar code associated with a product with a mobile device configured to capture an image of a barcode that encodes the URI.

In some implementations, the tag can encode an identifier that can be provided to a data storage system that is configured to map identifiers to URIs. For example, the data storage system can be a relational database that includes a table that maps identifiers to URIs. The system can present the identifier to the database, for example, using a Structured Query Language (SQL) command, and receive in response the product identifier.

The system can receive the request over any suitable networking protocol. For example, the system can receive a request as an HTTP message or an HTTPS message. In some implementations, the system can provide a Web Services API and accept the request when a client device invokes the API.

The system finds (230) routing policies entries based on the identifier of the product. The system can find routing policy entries by using the product identifier as a key in a request to a data store (such as the table described above) that holds associations between product identifiers and policies (which contain routing directives that are used to create the routing policy entries). The system can present the product identifier from the request to the data store and receive a set of policies associated with the product identifier. The system can identify the routing directive components of the policies and store them as routing policy entries.

In some instances, the system will find no such routing policy entries. In such cases, the system can produce an error message and terminate.

In some instances, the system will find only a single routing policy entry associated with the product identifier and include that entry in the set. In other instances, the system can find a set of two or more routing policy entries that have been associated with the product and include all such routing policy entries in the set. In either case, each identified routing policy entry in the set can include a regular expression that specifies syntax for parsing the initial URI. As noted above, the routing policy entries can include at least one variable.

The system determines (235) whether any routing policy entries found in operation 230 has an associated context specification that does not match context information associated with the request. For each such routing policy entry, the system can identify its context specification and evaluate the criteria from the context specification against the context information associated with the request. For example, if the product is associated with three routing policy entries, the system can determine the three sets of context specifications, one from each policy entry, and determine whether any component of each context specification relates to a specific context (e.g., both specify a language), and if so, whether the component is satisfied. For example, if the criterion requires that the language be English, then the component is satisfied only if the context information associated with the request specifies that the language is English. As noted above, the context specification can include factors such as (1) active from/to date criteria, (2) language criteria, and (3) geolocation(s) criteria. In cases where the component is not satisfied for a routing policy entry, the system can remove that routing policy entry from the set as described further below.

Thus, when any such mismatch exists, the system proceeds to operation 240. When no such mismatch exists, the system proceeds to operation 245.

In operation 240, the system eliminates one or more mismatching policy entries. The system can remove from the list of routing policy entries determined in operation 230 any routing policy entry determined not to match in operation 235.

The system determines (245) whether any routing policy entries from the set have a regular expression that does not match the initial URI. For each remaining routing policy entry, the system can evaluate the criterion referenced by or included in each policy that includes the routing policy entry. The system can identify such policies using operations analogous to those used in operation 235. That is, the system can, for each remaining routing policy entry R, compare R to the routing policy entries from each policy P, and when a match exists between R and a routing policy entry in policy P, store the policy P (or a reference to P). Then, for each stored policy S, the system can identify the criteria included in, or referenced by, S.

The system can evaluate the criteria against the initial URI, and remove from the set any routing policy entries that do not satisfy the criteria of at least one policy containing the routing policy entry. As noted above, criteria can include regular expressions against which the system can evaluate the initial URI. For example, a criterion might specify that a URL must match "*exam*", where "*" is a wildcard character. If the URI contains the substring "exam," for example, "example.com," "example 2.com," "1 example.com," and so on, then the URI will match, and will not match otherwise. For example, "xam.com" would not match since it lacks an "e" before "xam."

As described above, a single routing policy entry can be associated with multiple policies, and therefore multiple sets of criteria. The system determines that a match exists if the URI-related criterion of any such policy is satisfied, and determines that a match does not exist otherwise. When any such a mismatch exists, the system proceeds to operation 250; if no such mismatch exists, the system proceeds to operation 255.

In operation 250, the system eliminates one or more mismatching policy entries. The system can remove from the list of remaining routing policy entries any routing policy entry determined not to match in operation 245.

The system selects (255) a routing policy entry. First, if the system determines that no routing policy entries remain, the system can generate an error message and terminate or await subsequent requests. If only a single routing policy entry remains, the system selects that remaining entry. If multiple routing policies entries remain in the list, the system can, in various implementations, select the first routing policy entry in the list, select a randomly-selected routing policy entry from the list, select a routing policy entry based on a priority associated with each routing policy entry, and so on.

The system composes (260) a target URI based on a selected routing policy entry and thereby determines the routing directive. The system can parse the incoming URI, determine values for static and variable content, and construct the target URI.

In some implementations, the routing directive includes a specification of the format of the incoming URI, and the system can use this specification to parse the incoming URI. For example, the specification can include one or more regular expressions, and the system can apply the regular expression(s) to the incoming URI. For example, a regular expression might specify that first five bytes of an element of the initial URI are the company prefix, the next ten bytes are the product ID, and next three bytes is lot number. Such values can be used to include variable content in the target URI, as described further below.

As described above, in some implementations, the routing directive can include a template for the target URI, and the template can include variable and non-variable components. The system can compose the target URI by copying the non-variable components verbatim into the target URI, evaluating the variable components and adding the results of the evaluations into the URI in the position(s) indicated by the template.

Evaluating the variable components for use in the target URI can include determining properties of the computing environment, querying data storage systems (e.g., relational databases), and inspecting the incoming URI. The system can determine properties of the environment by inspecting variables provided by the computing environment. Such properties can reflect information such as the time and date, and static and dynamic metrics related to the computing environment. For example, one or more operating system computing environment can include APIs that provide a broad range of metrics, such as information about current and historic load, network speed (e.g., maximum speed, current throughput, minimum latency, current latency, etc.), available storage capacity, and so on.

In some implementations, such metrics allow the system to construct a target URI that improves the operation of the computing system. For example, the computing environment can provide load metrics for a set of potential servers to which the client device will be redirected, and the system can select the least loaded server for the target URI, thereby providing load balancing among the servers. In another example, the system can select a server coupled to a storage device with the largest capacity. In still another example, the system can select a server that has the most unused network bandwidth, providing network load balancing. The system can evaluate multiple such metrics when determining the server to which to redirect. For example, the system can determine the least loaded server that has at least a threshold level of unused network bandwidth, and direct the redirection to that server.

The system can query data storage systems to retrieve information relevant to the target URI. For example, a data store can include, for product identifiers (e.g., included in the source URI), information about the product that is relevant to the target URI (e.g., whether a product is in stock). In some implementations, the product identifier can include an identifier for the type of product (e.g., 2-liter bottles of cola) and a serial number for a specific instance of the product (e.g., one specific 2-liter bottle of cola), and the data store can include information relating to specific instances. For example, the data store can include product tracking information that reflects properties of instances of a product as they travel through a supply chain. Information relevant to a product instance can include lot information, expiration date, the current state of the product, born on information, recall information, and so on. The system can then include the retrieved information, in whole or in part, in the target URI at the location specified by the target URI template.

Having created the target URI, the system redirects (265) the server. In some implementations, the system can provide a redirect message, such as a redirect message described in reference to FIG. 1, which redirects the client device to the target URI. In response to receiving the redirect message, the client device contacts the server specified in the target URI, which causes the specified server to produce and deliver the content to the computing device of the user. The system can provide the redirect message over HTTP using conventional HTTP redirection techniques.

Figure 3:
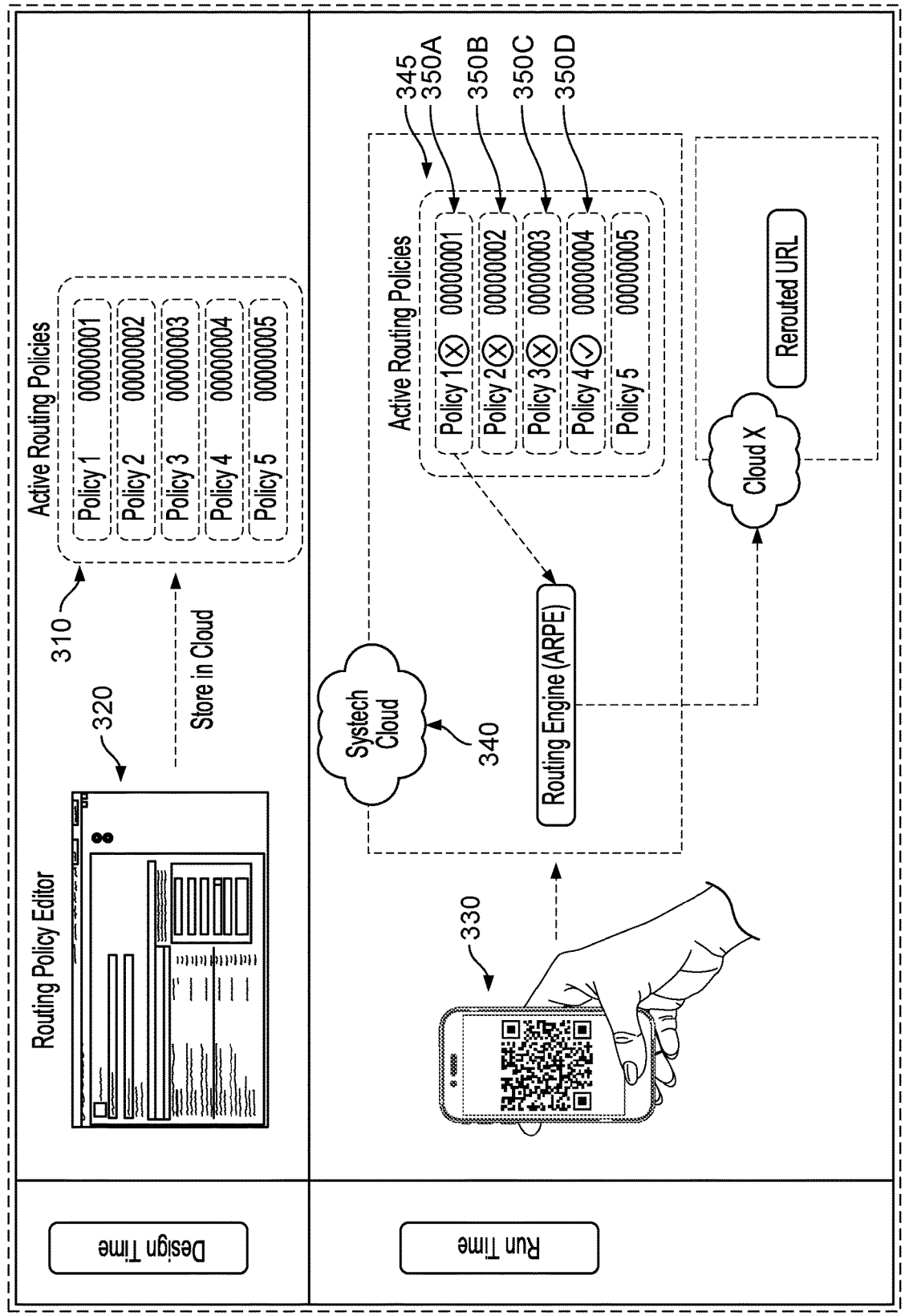
FIG. 3 shows design time and run time processes.

FIG. 3 shows design time and run time processes in accordance with some implementations. Although described in the context of 2-D barcodes, other data carrier tags, e.g., NFC tags, or data carrier labels can also be used. At design time, a user (e.g., at an enterprise) will author a set of Active Routing Policies 310 using a routing policy editor 320. These policies 310 offer details on how to understand the incoming URI in an attempt to parse the incoming URI to isolate and extrapolate parts of the incoming URI to participate in the construction of a target URI. In some implementations, each policy is composed of a set of criteria that is used to locate the best matching routing entry by the Active Routing processing engine, and target URL composition instructions. The set of criteria can include a RegEx expression mapping the source URL and also various types of context information, such as (1) active from/to date criteria, (2) language criteria, and (3) geolocation(s) criteria, among others.

In addition, during design time, each of potentially many product definitions is associated with one or more routing definitions. This enables the ARPE to find the best matching routing request amongst all of those associated with the product.

Although a device camera 330 is illustrated, other devices can be used. Other devices can include, for example, any device coupled to a sensor. The sensor can include a sensor adapted for visual sensing, Bluetooth sensing, RFID sensing, charge-coupled device (CCD) sensing, Complementary Metal Oxide Semiconductor (CMOS) sensing, and can also include an image reader, Optical Character Recognition (OCR), and the like, or a combination thereof.

Although a 2-D barcode is illustrated, other tags can be used, for example, any machine-readable optical, electronic or digital tag that can contain information. The tags may transmit signals that are received, emitted, or reflected by a device. Signals can include visual (i.e., visual capture or processing of a 2-D bar code) and non-visual presentations (e.g., processing of an NFC tag). Devices can also include, for example, any device adapted for processing augmented reality or virtual tags. In some implementations, tags are stored and retrieved for processing by ARPE.

At run time, a user can point a device camera 330 or sensor at, on, near or in close proximity with, or touched to a 2-D barcode or an NFC tag. In some implementations, the tag is generated, stored or retrieved, or a combination thereof. The camera app or sensor-related logic or general processing logic will prompt the user, if they want to launch the browser and initiate the designated URL. The user elects to launch the page. In some implementations, the designated URL is automatically initiated and launched. The request (by way of the URL), will be directed to a server system hosted cloud instance 340. The ARPE will isolate the product-id from the URL. Once isolated, ARPE will then use the product-id to locate the product definition. All of the routing policies 345 referenced by the product definition will be made ready for evaluation.

ARPE will begin to eliminate routing candidates evaluating the incoming URL. Any entry not active (according to date criteria) is eliminated from consideration. Any entry associated with a geolocation that is not matching is eliminated from consideration. Any entry associated with a language that is not matching is eliminated from consideration. Any RegEx that does not match the incoming URL is eliminated from consideration. Eliminated policies 350A, 350B, 350C can be identified in a user interface panel with a marker such as an "X."

Once all non-qualifying candidates are eliminated, the first routing policy that matches all criteria 350D is then used to compose the new target URL, and the original request is then redirected to the newly composed URL. If no matching routing entry is located, a user can be notified, for example, with a standard "Oops, something went wrong" page, or another default action (e.g., a default rerouting) can be taken.

In some implementations, a user with any computing device adapted for processing signals related to a tag, upon interacting with the tag, can be redirected to a digital experience destination by utilizing re-routing directives. The digital experience destination can include any digital source or location, including for example a website, a program, a document, video or audio, and initiation of sending or receiving payment information, among others. In some implementations, the digital experience destination is dynamically generated for each interaction with the tag, depending on the factors related to the interaction.

In some implementations, a user with an ordinary mobile device 330 can interact with a product connection point such as scanning a product barcode, and the mobile device's camera app will decode and prompt the user to launch a web browser, e.g., no specific hardware or mobile app is required. In some implementations, a user with an ordinary mobile device 330 can interact with any product connection point, including for example, a QR code or an NFC tag. Mobile device 330 can include a Bluetooth sensor, an RFID sensor, image reader or any component capable of interacting with a product connection point. The web browser will submit the URL (embedded in the product barcode). A server system cloud instance 340 will receive the incoming URL and locate the corresponding re-routing directives. Based on re-routing directives, the server system's Active Routing will compose a new URL. The re-routing directives can indicate composition of a new URL, based at least on ARPE logic and/or one or more of source-URL content, variable resolution, geolocation, time, date, and the user's locale, as described above in reference to FIG. 5. The new-URL will be initiated, and as a result, a server system's hosted web page or a user specified web page is shown, as described above in reference to FIG. 6. Thus, while using a standard mobile device camera 330 or another sensor, and combined with the Active Routing technology described, a site can direct the mobile device user to an informational page for the product/item being scanned. The landing page can be one that is hosted by the routing server system, but the page can still be tailored to the product (e.g., with site branding, variable text, social media icons, product name, description, and providence information), or the landing page can be a customer-hosted product page. The landing page can include any digital experience destination such as a website or a native mobile application.

Although not shown, design time and run time processes can be implemented utilizing edge computing, extending cloud computing and services to the edge of a network, for example, using computing nodes deployed inside access networks, mobile devices, or Internet of Things (IoT) end devices such as sensors and actuators. In this example, some or all components in whole or in part may be implemented in the edge nodes utilizing edge gateways for performing the resource intensive tasks. In some implementations, the edge nodes and gateways are intermediary to cloud 340. As used herein, cloud or edge computing can be applied to any device described herein, or components thereof, and relates to an implementation in which at least a portion of the functionality is implemented as one or more cloud or edge components.

In any case, a user is enabled to define a set of directives through a user interface 320 of the server system, and these directives offer guidance on how to parse the incoming URL, compose the target URL, and propagate data (static or varying). A target URL can be constructed by propagating information from the source URL as well as user defined static/dynamic variables. A site can have an array of routing directives, and a best matching route entry is selected based on the contents of the source URL and context information (e.g., Date, Geolocation, Language). Moreover, the user interface can allow the user to preview and/or verify the active route resolution through simulation of inbound requests.

In some implementations, the attributes that can be used to construct the target URL include: any accessible element from the source URL, any user defined static or dynamic variable, and any software metadata maintained by a product tracking system (a computer system that traces products through a supply chain). For example, pulling the unique serial number of a product from the URL and then submitting this to the product tracking system can allow the retrieval of additional metadata that is then made available to the user of the mobile device, e.g., the mobile device with the camera used to decode the product's 2D barcode can be shown extended product/item information by way of a browser web page. In general, the systems and techniques described in this application can be implemented in combination with a suitable product tracking and/or authentication system to retrieve appropriate metadata, e.g., through an application programing interface (API) of the product tracking and/or authentication system. In addition, the systems and techniques described in this application can be implemented in combination with the systems and techniques described in one or more of: U.S. Pat. Nos. 8,190,279; 10,061,958; 9,940,572; U.S. Pat. Pub. No. 2018-0314869; U.S. Pat. Pub. No. 2019-0005288; U.S. Pat. Nos. 10,235, 597; 9,794,321; 9,582,595; U.S. Pat. Pub. No. 2020-0151738; and U.S. Pat. Pub. No. 2019-0190739; each of which is hereby incorporated by reference.

FIG. 10 shows a process for simulating dynamic rerouting of URIs having different syntaxes. While this specification has previously described techniques for rerouting requests, it is beneficial to allow systems administrators to simulate the process of translating an incoming URI to a target URI. Using the techniques described in reference to FIG. 10, an administrator can define policies then apply the policies to incoming URIs to generate target URIs. However, instead of rerouting requests, the system can display the target URIs, allowing the administrator to review the target URIs for accuracy before deploying them to a production system.

For convenience, the process 1000 will be described as being performed by a system for dynamic rerouting of Uniform Resource Identifiers having different syntaxes, e.g., the system 100 for dynamic rerouting of Uniform Resource Identifiers having different syntaxes of FIG. 1, appropriately programmed to perform the process. Operations of the process 1000 can also be implemented as instructions stored on one or more non-transitory computer readable media, and execution of the instructions by one or more data processing apparatus can cause the one or more data processing apparatus to perform the operations of the process 1000. One or more other components described herein can perform the operations of the process 1000. In addition, the process of operations 1010, 1015, 1020, 1030, 1035, 1040, 1045, 1055, 1060 of FIG. 10 can employ the same or similar operations as the operations 210, 215, 220, 230, 235, 240, 245, 255, 1060 of FIG. 2.

The system presents (1010) a user interface by providing user interface presentation data to a client device. The user interface presentation data include instructions that, when executed by a client device, enable a user to define routing policy entries, including definition of context specifications, regular expressions and variables.

Upon receiving policy data, which can be provided in response to a user interacting with the user interface presentation data, the system specifies (1015) routing policy entries in accordance with the policy data.

The system associates (1020) routing policy entries by associating the identifier of a product with the routing policy entries in accordance with data received in response to a user interacting with user interface presentation data.

The system simulates (1021) an inbound request in accordance with an input received from the user interface. The input can include context information and an initial uniform resource identifier (URI) that includes the identifier of a product. The simulation can include operations 1025 to 1065.

As part of the simulation, the system receives (1025) a request that includes an initial URI that includes a product identifier. The system can provide user interface presentation data that, when rendered on a client device, enables a user (such as an enterprise user) to specify a request that includes a URL that includes a product identifier. The system can then receive the specified request from the user interface. In some implementations, the request, which the initial URI, is constructed (1025) from data available in the system, e.g., as entered by the user in the user interface of the system.

The system finds (1030) routing policies entries based on the identifier of the product, and the system determines (1035) whether any routing policy entries from the stored routing policy entries have an associated context specification that does not match context information associated with the request. When such a mismatch exists, the system proceeds to operation 1040 in which the system eliminates one or more mismatching policy entries.

The system determines (1045) whether any routing policy entries from the set have a regular expression that does not match the initial URI. When such a mismatch exists, the system proceeds to operation 1050.

In operation 1050, the system eliminates one or more mismatching policy entries. The system can remove from the list of remaining routing policy entries any routing policy entry determined not to match in operation 1045.

The system selects (1055) a routing policy entry and composes (1060) a target URI based on a selected routing policy entry and thereby determining the routing directive.

Figure 11:
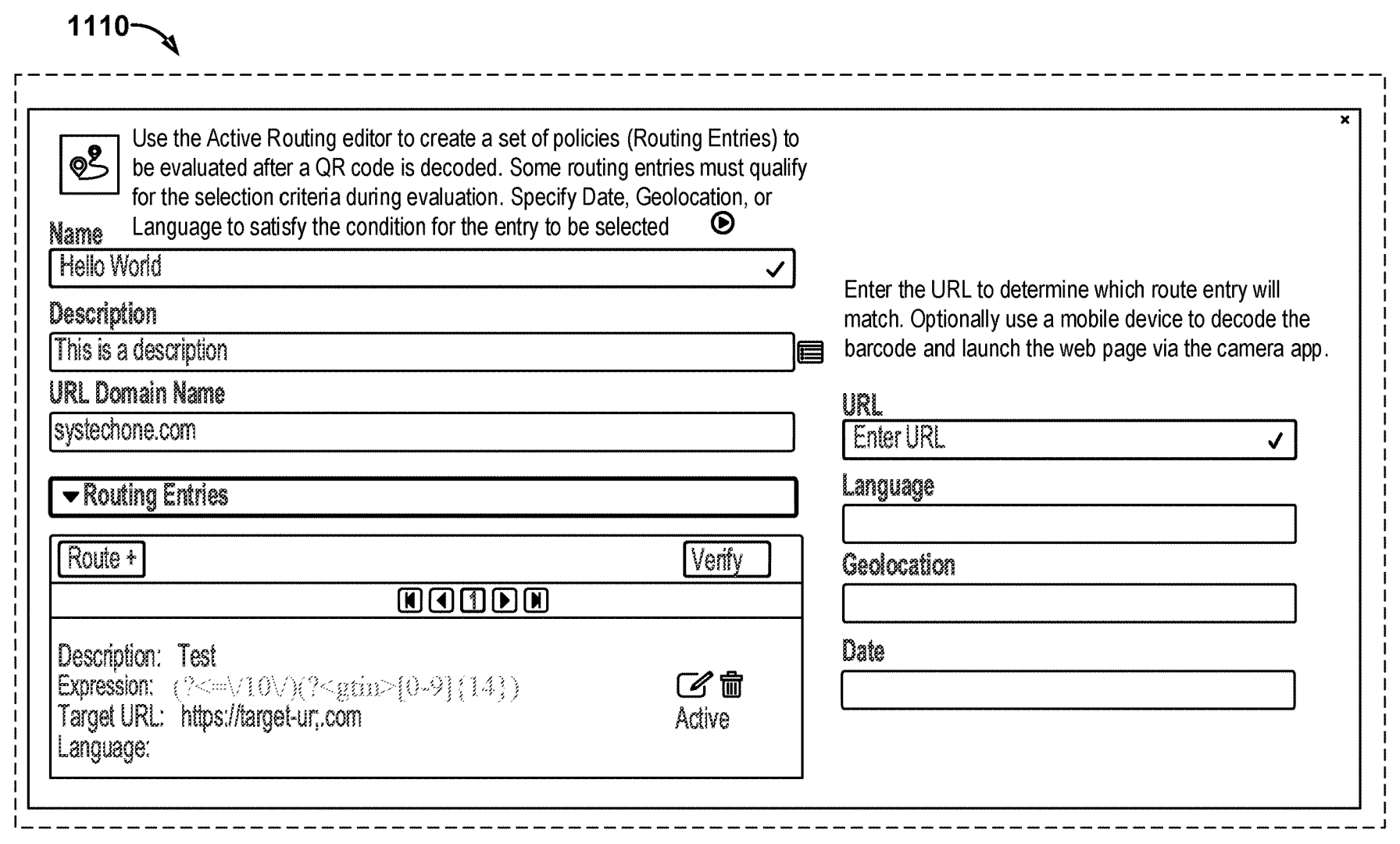

The system presents (1065) the composed target URI. The system can create user interface presentation data that includes the target URI. In some implementations, the user interface presentation data can be HTML code that describes a user interface containing the target URI. In some implementations, the user interface presentation data can be executable code that, when rendered by a client device, causes the client device to display a user interface containing the target URI. In some implementations, the user interface presentation data is a combination of HTML and executable code. In addition, markup languages (e.g., XML) or other user interface description languages can be used instead of, or in addition to, HTML. For example, FIG. 11 shows an example of an active routing verification editor 1110 that can be rendered from user interface presentation data. The active routing verification editor 1110 of this example includes routing policies for a domain name.

In some implementations, the user interface presentation data is generated based on a user defined decision tree for identifying routing policy entries. For example, user policy entries may be specified (1015) and organized in a decision tree format that can depend on element values associated with a particular product, the product's connection point, the user's device interacting with the connection point, or a combination thereof.

Once a client system renders the user interface presentation data, a user can view the target URI and by interacting with the user interface presentation data that includes the target URI, a user can confirm that target URI. For example, the user interface presentation data can include a description of a confirmation button. When the user selects the confirmation button, the user interface presentation data can cause a message to be sent from the client device to the system, to one or more other computing systems, or to both.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, special purpose microprocessors. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computing device capable of providing information to a user. The information can be provided to a user in any form of sensory format, including visual, auditory, tactile or a combination thereof. The computing device can be coupled to a display device, e.g., an LCD (liquid crystal display) display device, an OLED (organic light emitting diode) display device, another monitor, a head mounted display device, and the like, for displaying information to the user. The computing device can be coupled to an input device. The input device can include a touch screen, keyboard and a pointing device, e.g., a mouse or a trackball, by which the user can provide input to the computing device. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Thus, unless explicitly stated otherwise, or unless the knowledge of one of ordinary skill in the art clearly indicates otherwise, any of the features of the embodiments described above can be combined with any of the other features of the embodiments described above.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:
   receiving, by a server system, a request from a computing device of a user, wherein the request comprises an initial uniform resource identifier (URI) comprising an identifier of a product of an enterprise, and the request has been generated from the user scanning a tag that is physically associated with a specific instance of the product;
   finding, by the server system and based on the identifier of the product, a set of two or more routing policy entries that have been associated with the product by the enterprise, wherein each routing policy entry in the set comprises a regular expression that specifies syntax for parsing the initial URI, and at least one of the routing policy entries in the set comprises at least one variable defined by the enterprise;
   eliminating, by the server system, any routing policy entries from the set having an associated context specification that does not match context information associated with the request;
   eliminating, by the server system, any routing policy entries from the set having a regular expression that does not match the initial URI;
   composing, by the server system, a target URI based on a remaining routing policy entry, which is the at least one of the routing policy entries in the set, including evaluating the at least one variable at the time of the composing to inform the composing of the target URI; and redirecting, by the server system, the computing device to the target URI, thereby causing both production of content in accordance with the target URI and delivery of the content to the computing device of the user.

2. The method of claim 1, wherein the regular expression of at least the remaining routing policy entry has been defined by the enterprise to specify the syntax for parsing the initial URI into pieces, the at least one variable comprises a variable specifying one or more of the pieces of the initial URI, the evaluating comprises extracting the one or more pieces of the initial URI, and the composing comprises adding the one or more pieces of the initial URI to the target URI.

3. The method of claim 2, comprising:
presenting, by the server system, a user interface that enables definition of the routing policy entries by the enterprise, including definition of context specifications, regular expressions and variables;
specifying, by the server system, the routing policy entries in accordance with first input received from the enterprise via the user interface; and
associating, by the server system, the identifier of the product with the routing policy entries in accordance with second input received from the enterprise via the user interface.

4. The method of claim 3, wherein specifying the routing policy entries comprises specifying how to compose a target URI for each respective routing policy entry using one or more of the variables defined by the enterprise and presented in a browsing element of the user interface, wherein each of the variables references static content, dynamic content, another variable, or a combination thereof.

5. The method of claim 1, wherein:
the evaluating comprises retrieving, by the server system and from a computer system configured to track products as the products travel through a supply chain, metadata for the specific instance of the product; and
the composing comprises adding at least a portion of the metadata to the target URI.

6. The method of claim 5, wherein the identifier of the product comprises a product identifier plus a serial number of the specific instance of the product, the retrieving comprises sending the serial number to the computer system and receiving the metadata, and the metadata comprises one or more of lot information, expiration date, current state of the product, born on information, and recall information.

7. The method of claim 3, wherein the user interface enables inbound request simulation as the routing policy entries are being defined by the enterprise.

8. The method of claim 3, wherein the initial URI is a uniform resource locator (URL), and the target URI is a URL.

9. A method comprising:
presenting, by a server system, a user interface that enables definition of routing policy entries by an enterprise, including definition of context specifications, regular expressions and variables;
specifying, by the server system, the routing policy entries in accordance with first input received from the enterprise via the user interface;
associating, by the server system, an identifier of a product with the routing policy entries in accordance with second input received from the enterprise via the user interface; and
simulating, by the server system, an inbound request in accordance with third input received from the enterprise via the user interface, wherein the third input comprises context information and an initial uniform resource identifier (URI) comprising the identifier of the product of the enterprise, and wherein the simulating comprises:
finding, based on the identifier of the product, a set of two or more of the routing policy entries, wherein each routing policy entry in the set comprises a regular expression that specifies syntax for parsing the initial URI, and at least one of the routing policy entries in the set comprises at least one variable defined by the enterprise,
eliminating any routing policy entries from the set having an associated context specification that does not match the context information,
eliminating any routing policy entries from the set having a regular expression that does not match the initial URI,
composing a target URI based on a remaining routing policy entry, which is the at least one of the routing policy entries, including evaluating the at least one variable at the time of the composing to inform the composing of the target URI, and
displaying the target URI in the user interface for confirmation by the enterprise.

10. The method of claim 9, wherein the regular expression of at least the remaining routing policy entry has been defined by the enterprise to specify the syntax for parsing the initial URI into pieces, the at least one variable comprises a variable specifying one or more of the pieces of the initial URI, the evaluating comprises extracting the one or more pieces of the initial URI, and the composing comprises adding the one or more pieces of the initial URI to the target URI.

11. The method of claim 9, wherein:
the evaluating comprises retrieving, by the server system and from a computer system configured to track products as the products travel through a supply chain, metadata for the specific instance of the product; and
the composing comprises adding at least a portion of the metadata to the target URI.

12. A system comprising:
a user device; and
one or more computers operable to interact with the user device, the one or more computers comprising a non-transitory computer-readable medium tangibly encoding a computer program operable to cause the one or more computers to
receive a request from a computing device of a user, wherein the request comprises an initial uniform resource identifier (URI) comprising an identifier of a product of an enterprise, and the request has been generated from the user scanning a tag that is physically associated with a specific instance of the product,
find, based on the identifier of the product, a set of two or more routing policy entries that have been associated with the product by the enterprise, wherein each routing policy entry in the set comprises a regular expression that specifies syntax for parsing the initial URI, and at least one of the routing policy entries in the set comprises at least one variable defined by the enterprise, eliminate any routing policy entries from the set having an associated context specification that does not match context information associated with the request;

eliminate any routing policy entries from the set having a regular expression that does not match the initial URI, compose a target URI based on a remaining routing policy entry, which is the at least one of the routing policy entries in the set, including evaluation of the at least one variable at the time of the composition to inform the composition of the target URI, and redirect the computing device to the target URI, thereby causing both production of content in accordance with the target URI and delivery of the content to the computing device of the user.

13. The system of claim 12, wherein the non-transitory computer-readable medium tangibly encodes the computer program operable to cause the one or more computers to:

present a user interface that enables definition of the routing policy entries by the enterprise, including definition of context specifications, regular expressions and variables;

specify the routing policy entries in accordance with first input received from the enterprise via the user interface;

associate the identifier of the product with the routing policy entries in accordance with second input received from the enterprise via the user interface; and simulate an inbound request in accordance with third input received from the enterprise via the user interface.

14. The system of claim 13, wherein the computer program is operable to cause the one or more computers to specify the routing policy entries by specifying how to compose a target URI for each respective routing policy entry using one or more of the variables defined by the enterprise and presented in a browsing element of the user interface, wherein each of the variables references static content, dynamic content, another variable, or a combination thereof.

15. The system of claim 13, wherein the initial URI is a uniform resource locator (URL), and the target URI is a URL.

16. The system of claim 12, wherein the regular expression of at least the remaining routing policy entry has been defined by the enterprise to specify the syntax for parsing the initial URI into pieces, the at least one variable comprises a variable specifying one or more of the pieces of the initial URI, the computer program is operable to cause the one or more computers to evaluate the at least one variable by extracting the one or more pieces of the initial URI, and the computer program is operable to cause the one or more computers to compose the target URI by adding the one or more pieces of the initial URI to the target URI.

17. The system of claim 12, wherein the computer program is operable to cause the one or more computers to evaluate the at least one variable by retrieving, from a computer system configured to track products as the products travel through a supply chain, metadata for the specific instance of the product, and the computer program is operable to cause the one or more computers to compose the target URI by adding at least a portion of the metadata to the target URI.

18. The system of claim 17, wherein the identifier of the product comprises a product identifier plus a serial number of the specific instance of the product, the retrieving comprises sending the serial number to the computer system and receiving the metadata, and the metadata comprises one or more of lot information, expiration date, current state of the product, born on information, and recall information.

19. The system of claim 12, wherein the one or more computers comprise a server system operable to interact with the user device through a data communication network, and the user device is operable to interact with the server system as a client.

20. The system of claim 19, wherein the user device comprises one of a personal computer, a mobile device, or a smart phone adapted for web browsing.

* * * * *